United States Patent [19]

Sherman

[11] 3,797,849

[45] Mar. 19, 1974

[54] HAND PROPELLED CART

[76] Inventor: Donald R. Sherman, 1157 Little Oak Dr., San Jose, Calif. 95129

[22] Filed: Feb. 5, 1973

[21] Appl. No.: 329,737

[52] U.S. Cl............. 280/47.37, 280/47.38, 188/20
[51] Int. Cl.............................................. B62b 7/00
[58] Field of Search........... 280/47.37, 47.38, 47.34, 280/47.17, 47.19, 47.24, 47.25; 188/19, 20, 21, 29

[56] References Cited
UNITED STATES PATENTS

| | | | |
|---|---|---|---|
| 3,170,709 | 2/1965 | Shackel | 280/47.34 |
| 2,784,979 | 3/1957 | Chamberlin | 280/47.24 |
| 2,905,482 | 9/1959 | Ruttger | 280/47.24 |
| 3,698,736 | 10/1972 | Shape | 280/47.18 |
| 2,903,082 | 9/1959 | Marcus | 280/37 R |

*Primary Examiner*—Robert R. Song
*Attorney, Agent, or Firm*—Moore, Zimmerman & Dubb

[57] ABSTRACT

A hand propelled cart which can be adapted for holding an infant carrying seat comprises a cart frame, a principal axle having a pair of oversized wheels mounted thereon, a substantially upright handle attached to said cart frame, a pair of brake supports attached to said cart frame adjacent each of said oversize wheels, a spring friction biased U-shaped braking frame, comprising two sides and a crossarm, the sides of which are adapted to pass, respectively, through said pair of brake supports and engage therewith in a spring friction fit, the open ends of said U-shaped frame having perpendicular extensions depending therefrom, said extensions being adapted to contact the tread on said oversize wheels and serving to brake said cart, said crossarm serving to support said cart in an intermediate rest position, the center of gravity of said cart lying between said principal axle and said crossarm when said oversize wheels and said crossarm rest on the ground.

11 Claims, 7 Drawing Figures

3,797,849

HAND PROPELLED CART

BACKGROUND OF THE INVENTION

This invention relates to hand propelled carts, and, more particularly, to a hand propelled cart which can be adapted to hold an infant carrying seat and having a spring friction biased U-shaped braking frame which can be pulled rearwardly to brake said cart and which can support said cart in an intermediate rest position.

Various hand propelled carts have been provided for serving specific functions such as golf carts, hand trucks and baby strollers. Some of these devices have been provided with brakes while others have not. Four wheeled baby strollers have sometimes been provided with brakes in order to insure that a small child may safely be left in a fixed location. The typical brake for strollers is an L-shaped piece of metal which would be pivotally mounted on the stroller frame and which could be rotated to rub against the tread of the stroller wheel. Such a brake is maintained in the on or off mode by the friction inherent in the pivot of the brake.

Infant strollers typically have been four wheeled vehicles which are moved along the ground with all four wheels on the ground. The development of a hand cart stroller of the type of the present invention permits an infant to be transported or left in a reclining or supine position. In such hand cart type stroller, whether two or four wheeled, the center of gravity is positioned near the center of the principal axle on which the rear wheels are mounted. In operation, the handle of the stroller is tilted rearwardly, and the stroller is moved forwardly on its rear wheels; to use over obstacles the front wheels, if any, can be tilted upwardly and the stroller lifted up and over the obstacles; at rest, a three point stable position can be achieved by resting the cart on the rear handle and the two rear wheels. The hand cart type stroller of the present invention further permits an intermediate rest position between the upright position at which all wheels rest on the ground and the horizontal position at which the rear wheels and the handle grip rest on the ground.

SUMMARY OF THE INVENTION

A hand propelled cart which can be adapted for carrying an infant seat has a cart frame with a principal axle having a pair of oversize wheels mounted thereon. An upright handle is also attached to said cart frame. A pair of brake supports which terminate in tubular shaped flanges are mounted on said cart frame, one of said brake supports being mounted adjacent to each of said rear wheels. A spring friction biased U-shaped braking frame, comprising two sides and a crossarm, is fitted through the tubular shaped flanges of said brake supports so that said crossarm is accessible at the rear of said cart and one of said sides passes through each of said tubular shaped flanges. The open ends of the sides of the U-shaped frame have perpendicular extensions depending therefrom, said extensions being adapted to contact, respectively, the tread of each of the oversize wheels so that when the crossarm is pulled rearwardly the extensions are brought into contact with the tread of the wheels to brake them.

The U-shaped braking frame may be constructed of resilient spring material so that the separation between the two sides may be slightly less than or slightly more than the distance between the two brake supports; consequently, a spring friction fit is obtained between said sides of said U-shaped frame and the tubular shaped flanges of the brake supports. A spring friction fit may also be created by constructing the brake supports out of spring steel and rolling the tubular shaped flanges to be smaller in diameter than the diameter of the braking frame. Thus, the tubular shaped flanges can expand under pressure to accept the braking frame and maintain a spring friction bias against the braking frame.

The U-shaped braking frame permits a stable intermediate rest position to be achieved. When the crossarm is pulled rearwardly and the cart is tilted backwardly so the crossarm rests on the ground, the cart assumes a stable intermediate rest position. In this position the weight of the partially inclined cart causes a slight bend in each of said sides of the U-shaped frame to further enhance the spring friction fit between the sides of the braking frame and the tubular shaped flanges of the brake supports and, at the same time, strengthens the contact between the perpendicular extensions and the oversize wheels.

BRIEF DESCRIPTION OF THE DRAWINGS

For a more complete understanding of the hand propelled cart of the present invention, reference may now be had to the accompanying drawings which are incorporated herein and in which.

DESCRIPTION OF THE PREFERRED EMBODIMENT

Figure 1:
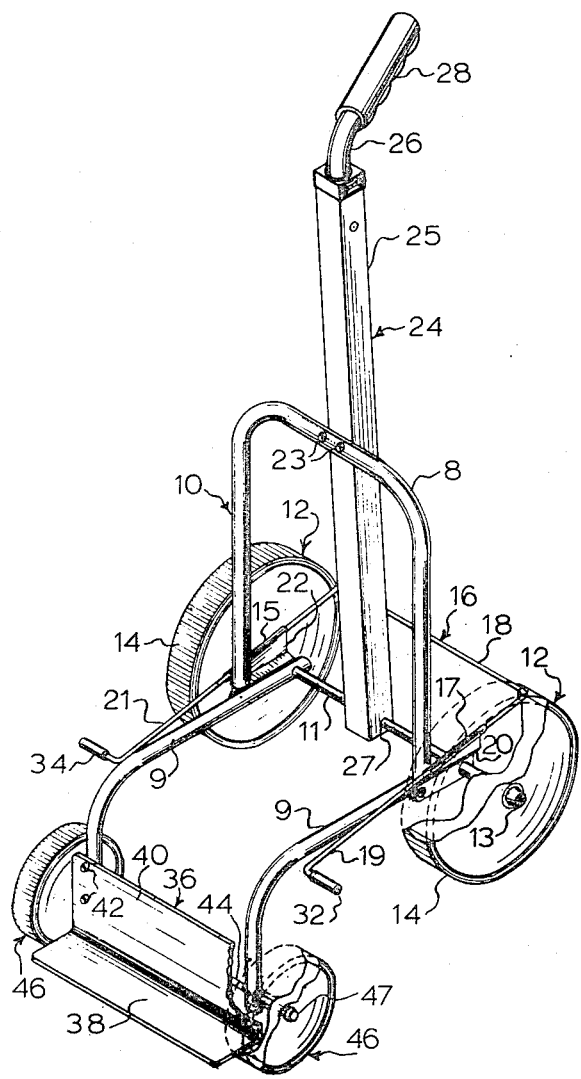
FIG. 1 is a perspective view of the hand propelled cart.
Figure 2:
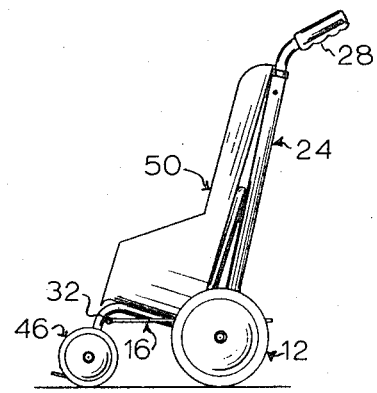
FIG. 2 is a side view of the hand propelled cart resting in the upright position.

The basic lightweight cart frame 10 is clearly shown in FIG. 1 to consist essentially of parallel runners 9 and inverted U-shaped handle support 8. Principal axle 11 fits through holes configured in the rearmost ends of parallel runners 9 while, in this embodiment, auxiliary axle 44 fits through holes configured in the forward curved ends of parallel runners 9. Upright handle 24 is attached, intermediate its ends, to the center of inverted U-shaped handle support 8 and has a circular passageway 27 in the bottom thereof to accommodate principal axle 11.

An infant carrying seat of the type shown in FIGS. 2, 3, 4, and 5 may be strapped, riveted, or otherwise attached to cart frame 10. A small child may be securely harnessed in the infant carrying seat and thus may be securely transported from place to place. The child will not be jostled from side to side as he would be if an infant carrying seat were loosely placed in a stroller constructed for carrying larger children. When strapped in place, a small child will be securely held in the seat when the hand propelled cart is in either the upright position (shown in FIG. 2), the intermediate rest position (shown in FIG. 3), or the horizontal rest position (shown in FIG. 4) or when the cart is being moved. The intermediate rest position is believed to provide the most comfortable support for a small child who is confined for a period of time.

The mechanism of the braking feature of the present invention is shown clearly in FIG. 1. Brake supports 20 and 22 are attached along the outside of the rearmost ends of parallel runners 9. Brake supports 20 and 22 terminate, respectively, in tubular shaped flanges 17 and 15. U-shaped spring friction biased frame 16 is seen to consist of crossarm 18 and sides 19 and 21; sides 19 and 21 are seen to slidably engage tubular shaped flanges 17 and 15, respectively. The construction of U-shaped frame 16 may be such that the separation between the sides 19 and 21 is slightly greater than or slightly less than the separation between tubular shaped flanges 17 and 15. Or, the internal shape or attitude of tubular shaped flanges 17 and 15 may be such that a friction fit is formed with sides 19 and 21. The spring friction fit achieved between U-saped frame 16 and tubular shaped flanges 17 and 15 causes U-shaped frame 16 to remain at any position at which it is placed. Perpendicular extensions 32 and 34 depend, respectively, from sides 19 and 21, and are covered with a slip-on cylindrical sheath having a high friction surface; these extensions will contact the tread 14 of the oversize rear wheels 12 when crossarm 18 is pulled rearwardly.

Figure 3:
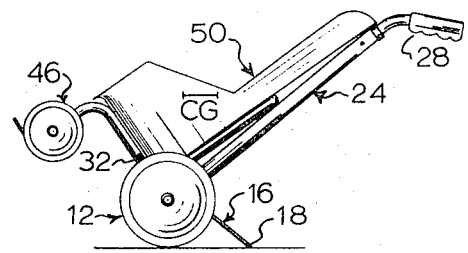
FIG. 3 is a side view of the hand propelled cart positioned in the intermediate rest position and illustrating the operation of the spring biased U-shaped braking frame.
Figure 4:
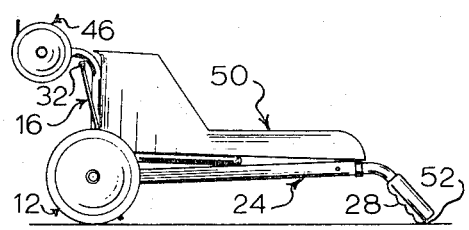
FIG. 4 is a side view of the hand propelled cart positioned in a horizontal mode.

In operation, as the hand propelled cart is being moved along the street or down a hill, the operator can apply a braking force by either pulling back on crossarm 18 with his hand or catch crossarm 18 with the heel or toe of his foot. The additional utility of U-shaped frame 16 is shown in FIG. 3. As long as the center of gravity of the cart with attached infant seat lies between principal axle 11 and the point of contact between crossarm 18 and the ground when crossarm 18 rests on the ground, as shown generally in FIG. 3, a stable intermediate rest position may be achieved. In this position, the weight of the hand propelled cart and its load forces sides 19 and 21 of U-shaped frame 16 to bend slightly so that the friction fit described above between sides 19 and 21 and tubular shaped flanges 17 and 15, respectively, is enhanced and the U-shaped frame 16 is held firmly in place. Additional braking action can be obtained when the cart is in the intermediate rest position if additional sheaths having a high frictional surface are placed along the crossarm 18.

The braking mechanism is operable at the operator's discretion whenever necessary. In the upright mode, shown in FIG. 2, the operator simply pulls rearwardly on crossarm 18 until contact is achieved between perpendicular extensions 32 and 34 and the tread 14. The brake is disengaged by simply pushing crossarm 18 forwardly. To disengage the brake from the intermediate rest position, the cart is simply tilted forward and the crossarm 18 is pushed forwardly. In the horizontal mode shown in FIG. 4, no brake is necessary as the friction between the upper end of handle grip 28 and the ground keeps the cart from rolling.

The cart of the present invention is especially useful if oversize wheels are employed on the principal axle so that a solid braking contact may be achieved between the perpendicular extensions 32 and 34 and the tread of the wheels. Such oversize wheels, typically 6 to 8 inches in diameter or greater, also permit the cart to be moved over soggy ground, through shag carpets or grass, and over cracks in sidewalks without undue impact upon the load being transported, e.g., a baby or a set of golf clubs. If it is contemplated that the load will be transported up over steps or over curbs, as with a baby stroller, front wheels mounted on an auxiliary axle are desirable for leverage: the operator simply tilts the cart handle downwardly which raises the front wheels above the level of the next stair or the curb, pushes the cart forward on the oversize wheels, sets the front wheels on the next step or on the curb, lifts the whole cart upward on the front wheels and pushes the cart forward on the front wheels until the oversize wheels, as well as the front wheels, rest on the next step or on the curb. The front wheels may be of a size smaller than the oversize rear wheels since they are not in use when the cart is moved over distances. If the cart is to be used as a golf cart, a pair of oversize wheels on a principal axle will suffice and no auxiliary axle is necessary.

Figure 5:
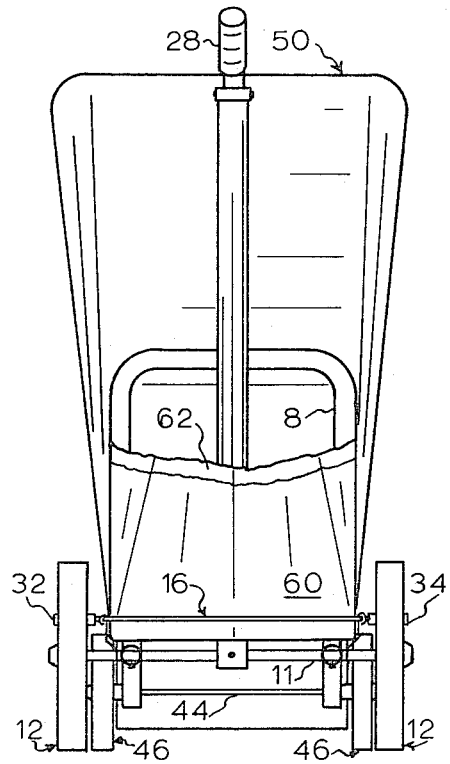
FIG. 5 is a rear view of the hand propelled cart.

As shown in FIG. 5, the hand cart of the present invention may have a carrying pocket 60 attached to the rear of inverted U-shaped handle support 8. If the cart is used as an infant stroller, then toys, bottles, diapers, and other similar items may be stored therein. An elastic band 62 serves to keep the carrying pocket closed so that items do not fall out.

Figure 7:
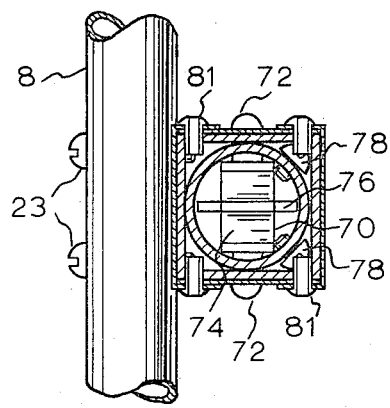
FIG. 7 is a section view through the top of the handle as shown in FIG. 6.
Figure 6:
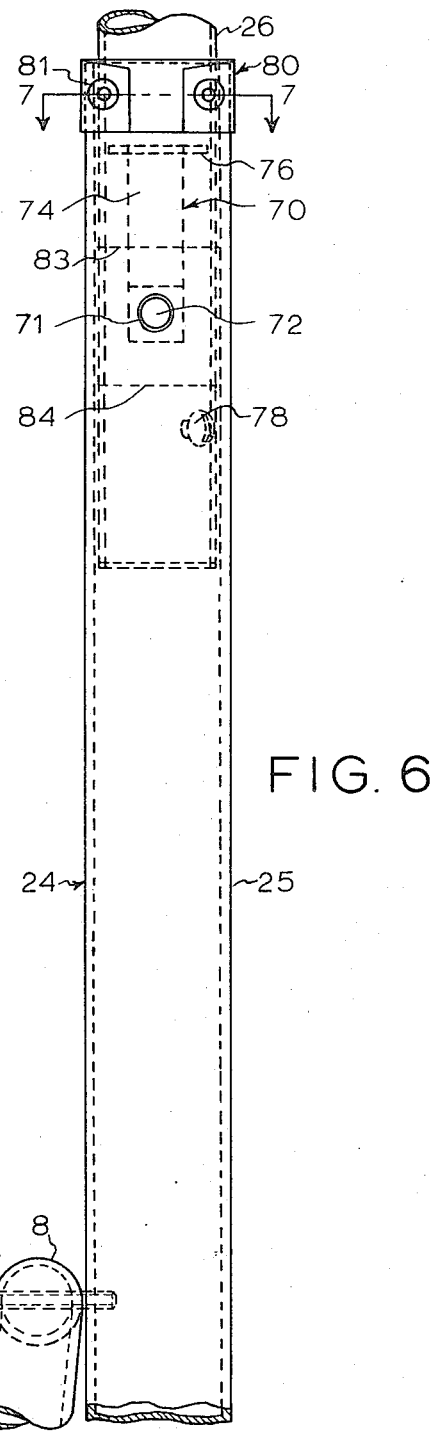
FIG. 6 is a partial side view of the handle of the hand propelled cart.

It has been found that the utility of the hand propelled cart is greatly enhanced if the handle does not rotate and if the handle is collapsible when the cart is not in use. The handle mechanism illustrated in FIGS. 6 and 7 provides both a nonrotating and a collapsible handle. Upright handle 24 consists of tubular member 26 inserted within square cross section channeling 25. Tubular member 26 terminates at its upper end in a curved stub over which a handle grip 28 is inserted. At the lower end of tubular member 26 position screws 78 are inserted so that they ride in the open interior corners of channeling 25. The edges of position screws 78 abut the interior of the sides of channeling 25 so that tubular member 26 cannot be pulled completely out of channeling 25 as position screws 78 cannot pass through cap assembly 80 since they hit the stems of pop inserts 81. To prevent abrasion or galling between channeling 25 and tubular member 26 a low friction insert 83 of a thin sheet material such as teflon or nylon is used around the interior of the upper end of channeling 25 and another sheet 84 is used around the exterior at the lower end of the tubular member 26. In addition, as a maintenance measure, a dry spray lubricant may be used from time to time on the surface of tubular member 26 to reduce friction.

The collapsed position of the hand propelled cart is shown in FIGS. 1 through 5. In this position, tubular member 26 is inserted as far as possible within square cross section channeling 25; this fully inserted position is determined by the point at which the curved stub of tubular member 26 reaches the opening in cap assembly 80. The raised position, shown in FIGS. 6 and 7, is determined by the point at which the matched openings 71 in channeling 25 and tubular member 26 come into coincidence so that moveable nubs 72 of locking assembly 70 pop out through the matched openings 71 to hold channeling 25 and tubular member 26 in fixed relative position. The use of position screws 78 insures that the tubular member 26 cannot rotate and therefore the matched openings 71 will always come into alignment. The structure of locking assembly 70 includes a brace 76 attached across the interior of tubular member 26, wishbone strips 74 and moveable nubs 72 attached to the bottom ends of wishbone strips 74. The locking assembly 70 is fabricated from a resilient material so that the two moveable nubs 72 can be pushed inwardly to clear the interface between the interior sides of square cross section channeling 25 and the exterior circumference of tubular member 26. Thus, the handle is collapsible by using, e.g., the thumb and forefinger to press moveable nubs 72 inwardly and then inserting tubular member 26 downwardly within channeling 25. With the handle extended, an infant stroller should preferably be about 3½ feet in height; with the handle collapsed, the stroller should preferably be about 26 inches in height. When the cart is being pushed, it is desirable to tilt the handle downwardly until the center of gravity is rearward of the principal axle so that the parent or nanny has to counteract a downward force as the stroller is pushed along.

The use of a tubular member 26 within a square cross-section channeling 25 also permits bolts or rivets 23 to pass through the wall of said square cross-section channeling and terminate in the open interior corners of said channeling; positioning screws 78 can then be used in any of the remaining open interior corners. Thus, it is possible to securely attach the upright handle 24 to the handle support 8 and form a rigid union without having to resort to costly welds or unitary fabrication.

Inverted U-shaped handle support 8 is attached to parallel runners 9 to form approximately a right angle therewith. In most two-wheeled carts, upright handles and handle supports are in the same plane so that separate supports are needed between the principal axle and each side of the handle support to form a rigid triangle on each side. One embodiment of the cart of the present invention eliminates these two supports by configuring a passageway 27 through the bottom section of the upright handle 24 to permit principal axle 11 to pass through. The upright handle 24 is then rotated forwardly until it contacts inverted U-shaped handle support 8 and is then attached as described above. Since the principal axle 11 is several inches rearward on the parallel runners 9 from the point of contact with inverted U-shaped handle support 8, it can be seen, if viewed from the side as in FIGS. 2 through 4, that a rigid structurally strong right triangle is formed. In other versions of the cart of the present invention principal axle 11 is attached externally to the bottom of handle 24.

In the four-wheeled embodiment adapted to hold an infant carrying seat, the rigidity of the cart is enhanced by attaching the back 40 of a footrest 36 to the curved front portions of the parallel runners 9 with at least two fastening devices 42 for each leg of said parallel runners. The rigid footrest then prevents independent motion of one parallel runner 9 with respect to the other. When the hand propelled cart of the present invention is used as an infant stroller, it is desirable that the lower lip 38 of the footrest 36 should extend out far enough to protect the toes of a small child strapped in an infant carrying seat.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:
1. A hand propelled cart adapted for holding an infant carrying seat, comprising:
a cart frame adapted to receive an infant carrying seat;
a principal axle attached rearwardly of said frame;
a pair of oversize wheels coaxially mounted on opposing ends of said principal axle;
upright handle means attached to said frame;
a pair of brake supports terminating in tubular shaped flanges attached to said cart frame respectively, adjacent each of said oversize wheels;
a spring biased U-shaped braking frame, comprising two sides and a crossarm, the sides of which pass, respectively, through each of said brake supports and engage therewith in a spring friction fit, the crossarm resting on the rearward side of said principal axle, the open ends of said sides of said U-shaped braking frame having wheel engaging extensions attached perpendicularly thereto to permit said cart to be braked by rearward movement of said crossarm and engagement of said extensions with the tread of said oversize wheels and to permit said cart to be placed in an intermediate rest position at which said crossarm and said oversize wheels rest on the ground;
an auxiliary axle attached to said cart frame in parallel relation to said principal axle and on the forward side thereof; and
a pair of front wheels coaxially mounted on opposing ends of said auxiliary axle.

2. A hand propelled cart in accordance with claim 1 in which said upright handle includes a tubular member inserted within a square cross section channel member, said tubular member having a diameter slightly less than the inside dimension of said square cross section channel member, and said tubular member having at least one nub protruding therefrom, said nub being positioned to ride in an open interior corner of said square cross section channel member to prevent said tubular member from rotating within said square cross section channel member.

3. A hand propelled cart in accordance with claim 2 wherein said cart frame includes an inverted U-shaped handle support the ends of which are attached, respectively, to parallel runners at approximately right angles thereto and forwardly of said principal axle, said parallel runners forming the base of said frame, the center of said inverted U-shaped handle support being attached to said square cross section channel member, said square cross section channel member having a passageway at the bottom thereof to accommodate said principal axle.

4. A hand propelled cart in accordance with claim 3 wherein the height of said upright handle is adjustable between a collapsed resting height and an expanded height at which the handle may be gripped as the cart is moved.

5. A hand propelled cart in accordance with claim 4, wherein said handle is fixedly held in said expanded position by a resilient V-shaped locking member compressively held within said tubular member, the tips of said V-shaped member being positioned adjacent openings in said tubular member so that said tips will pass through said openings and fit into matched openings configured in said square cross section channeling.

6. A hand propelled cart in accordance with claim 5 in combination with an L-shaped foot rest attached forwardly of said cart frame so the lower lip of said foot rest acts as a front bumper to permit an infant positioned in said infant carrying seat to rest his feet on said lip and to dangle the back of his feet against the back of said foot rest to prevent them from swinging under said cart frame.

7. A hand propelled cart in accordance with claim 6 in combination with a utility bag attached rearwardly of said cart frame and positioned generally between said oversize wheels.

8. A hand propelled cart in accordance with claim 6 in combination with an infant carrying seat positioned within said cart frame.

9. A hand propelled cart, comprising:
a cart frame;
an axle means having a pair of oversize friction wheels coaxially mounted on opposing ends of said axle means;
upright handle means attached to said frame;
a pair of brake supports terminating in tubular shaped flanges, said brake supports being mounted, respectively, on said frame adjacent each of said wheels; and
a spring friction biased U-shaped braking frame, comprising two sides and a crossarm, the sides of which pass, respectively, through each of said brake supports and engage therewith in a spring friction fit, the crossarm resting on the rearward side of said axle means, the open ends of said sides of said U-shaped braking frame having wheel engaging extensions attached perpendicularly thereto to permit engagement of said wheel engaging extensions with the tread of said oversize wheels so that said cart may be braked by rearward movement of said crossarm and so that said cart may be placed in an intermediate rest position wherein said crossarm rests on the ground and said extensions engage said tread of said oversize wheels.

10. A hand propelled cart in accordance with claim 9 in which said upright handle comprises a tubular member inserted within a square cross section channel member, said tubular member having a diameter slightly less than the inside dimension of said square cross section channel member, and said tubular member having at least one nub protruding therefrom, said nub being positioned to ride in an open interior corner of said square cross section channel member to prevent said tubular member from rotating within said square cross section channel member, and means for adjusting the height of said upright handle between a collapsed resting height and an extended height at which the handle may be gripped as the cart is moved.

11. A hand propelled cart in accordance with claim 10 wherein said cart frame includes an inverted U-shaped handle support the ends of which are attached, respectively, to parallel runners at approximately right angles thereto and forwardly of said principal axle, said parallel runners forming the base of said frame, the center of said inverted U-shaped handle support being attached to said square cross section channel member, said square cross section channel member having a passageway at the bottom thereof to accommodate said principal axle.

* * * * *